United States Patent
Tang

(10) Patent No.: US 11,317,366 B2
(45) Date of Patent: Apr. 26, 2022

(54) SYNCHRONOUS CARRIER SELECTION METHOD AND APPARATUS, AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/937,138

(22) Filed: Jul. 23, 2020

(65) Prior Publication Data
US 2020/0359344 A1 Nov. 12, 2020

Related U.S. Application Data

(63) Continuation of application No. PCT/CN2018/074166, filed on Jan. 25, 2018.

(51) Int. Cl.
*H04W 56/00* (2009.01)
(52) U.S. Cl.
CPC .................. *H04W 56/001* (2013.01)
(58) Field of Classification Search
CPC ........... H04W 56/001; H04W 56/0015; H04W 72/02; H04W 4/40; H04W 72/0453;
(Continued)

(56) References Cited

U.S. PATENT DOCUMENTS

2016/0072559 A1 3/2016 Chen et al.
2016/0227479 A1 8/2016 Ma
(Continued)

FOREIGN PATENT DOCUMENTS

CN 102136899 A 7/2011
CN 102396277 A 3/2012
(Continued)

OTHER PUBLICATIONS

LG Electronics, "Remaining issues on synchronization for sidelink CA", 3GPP TSG RAN WG1 Meeting 91 R1-1719867, Reno, USA, Nov. 27-Dec. 1, 2017.
(Continued)

*Primary Examiner* — Kyaw Z Soe
(74) *Attorney, Agent, or Firm* — Perkins Coie LLP

(57) ABSTRACT

Disclosed are a method and device for selecting a synchronization carrier, and a computer storage medium. The method comprises: determining, by a terminal, two or more synchronization carriers from a plurality of carriers, wherein synchronization information is provided on each of the synchronization carriers; selecting, by the terminal, a first synchronization carrier from the two or more synchronization carriers based on reference information of the two or more synchronization carriers, wherein the first synchronization carrier is used for providing first synchronization information for each of the plurality of carriers, to enable the plurality of carriers to transmit data synchronously based on the first synchronization information.

20 Claims, 5 Drawing Sheets

---

301
A terminal determines two or more synchronization carriers from a plurality of carriers, with synchronization information on each of the synchronization carriers 302
The terminal selects a first synchronization carrier from the two or more synchronization carriers based on reference information of the two or more synchronization carriers, the first synchronization carrier being configured to provide first synchronization information for each of the plurality of carriers such that the plurality of carriers transmits data synchronously based on the first synchronization information

(58) Field of Classification Search
CPC ... H04W 72/085; H04W 72/10; H04W 92/18; H04L 5/001
See application file for complete search history.

(56) References Cited

U.S. PATENT DOCUMENTS

| | | | |
|---|---|---|---|
| 2017/0024354 | A1 | 1/2017 | Zhang et al. |
| 2018/0139769 | A1* | 5/2018 | Lee ................. H04L 5/0094 |
| 2018/0220388 | A1* | 8/2018 | Chae ............... H04W 56/0015 |
| 2020/0154384 | A1 | 5/2020 | Chae et al. |

FOREIGN PATENT DOCUMENTS

| | | |
|---|---|---|
| CN | 103237354 A | 8/2013 |
| CN | 104158578 A | 11/2014 |
| CN | 104247300 A | 12/2014 |
| CN | 104581834 A | 4/2015 |
| CN | 106255208 A | 12/2016 |
| CN | 107124770 A | 9/2017 |
| CN | 107294889 A | 10/2017 |
| EP | 2654237 | 10/2013 |
| JP | 2016521520 A | 7/2016 |
| WO | 2016175639 A1 | 11/2016 |
| WO | 2017007285 A1 | 1/2017 |
| WO | 2017135650 A1 | 8/2017 |

OTHER PUBLICATIONS

Second Office Action of the Chinese application No. 201880037521.0, dated Oct. 30, 2020.
Catt: "Discussion on synchronization for carrier aggregation in V2X Phase 2", 3GPP Draft; R1-1720159, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, (Nov. 18, 2017), XP051369796 * Section 3 *.
ZTE et al: "Synchronization in sidelink CA", 3GPP Draft; R1-1719655-6.2.3.1.2 Synchronization in Sidelink CA, 3rd Generation Partnership Project (3GPP), Mobile Competence Centre; 650, Route Des Lucioles; F-06921 Sophia-Antipolis Cedex; Fran, vol. RAN WG1, No. Reno, USA Nov. 27, 2017-Dec. 1, 2017, (Nov. 17, 2017), XP051368834 * Section 2*.
Supplementary European Search Report in the European application No. 18901865.8, dated Feb. 2, 2021.
Notice of Rejection of the Chinese application No. 201880037521.0, dated Feb. 2, 2021.
Qualcomm Incorporated. "R1-1721247 Summary of offline discussions on PC5 CA synchronization", 3GPP TSG RAN WG1 Meeting #91, issued on Dec. 1, 2017, section 2, 3.
Qualcomm Incorporated. "R1-1720409 Synchronization for V2X PC5 Carrier Aggregation", 3GPP TSG RAN WG1 Meeting #91, dated Nov. 18, 2017, section 2.
First Office Action of the Chinese application No. 201880037521.0, dated Aug. 5, 2020.
Written Opinion of the International Search Authority in the international application No. PCT/CN2018/074166, dated Aug. 15, 2018.
Huawei et al."R1-1719514, Remaining Details for Synchronization for Carrier Aggregation on Sidelink" 3GPP TSG RAN WG1 Meeting#91, Dec. 1, 2017 (Dec. 1, 2017), sections 2-3.
International Search Report in the international application No. PCT/CN2018/074166, dated Aug. 15, 2018.
First Office Action of the Indian application No. 202017036223, dated Aug. 26, 2021. 6 pages with English translation.
Notice of review of the Chinese application No. 201880037521.0, dated Oct. 26, 2021. 8 pages with English translation.
LG Electronics, "Discussion on synchronization for sidelink CA", 3GPP TSG RAN WG1 Meeting #90bis R1-1717265, Prague, Czechia, Oct. 9-13, 2017. 3 pages.
Intel Corporation, "Sidelink carrier aggregation for LTE V2V communication", 3GPP TSG RAN WG1 Meeting #89 R1-1707300, Hangzhou, P.R. China May 15-19, 2017. 8 pages.
Ericsson, "Coexistence Between Sidelink and Uplink Transmission", 3GPP TSG-RAN WG2 #97 Tdoc R2-1700948, Athens, Greece, Feb. 13-17, 2017. 4 pages.
ZTE, "Discussion on carrier selection in PC5 CA", 3GPP TSG-RAN WG2 Meeting #100 R2-1713070, Reno, USA, Nov. 27-Dec. 1, 2017. 6 pages.
First Office Action of the Japanese application No. 2020-560517, dated Dec. 7, 2021. 8 pages with English translation.
Decision of Re Examination of the Chinese application No. 201880037521.0, dated Feb. 8, 2022. 21 pages with English translation.
First Office Action of the Taiwanese application No. 108102704, dated Jan. 25, 2022. 10 pages with English translation.

* cited by examiner

SYNCHRONOUS CARRIER SELECTION METHOD AND APPARATUS, AND COMPUTER STORAGE MEDIUM

CROSS-REFERENCE TO RELATED APPLICATION

This is a continuation application of International Patent Application No. PCT/CN2018/074166, filed on Jan. 25, 2018, the content of which is incorporated by reference herein in its entirety for all purposes.

TECHNICAL FIELD

The disclosure relates to the technical field of wireless communications, and more particularly, to a method and device for selecting a synchronization carrier, and a computer storage medium.

BACKGROUND

A Long-Term Evolution (LTE) Device-to-Device (D2D) based Sidelink (SL) transmission technology is used in a Vehicle-to-Everything system. Different from the approach that communication data is received or sent through a base station in a conventional LTE system, a terminal-to-terminal direct communication mode is employed in the Vehicle-to-Everything system, thus having a higher spectral efficiency and a lower transmission delay.

In the 3rd Generation Partnership Project (3GPP) Rel-14, the Vehicle-to-Everything (V2X) technology is standardized, and, two transmission modes, i.e., mode 3 and mode 4, are defined. In mode 3, a transmission resource for a terminal is allocated by a base station. In mode 4, a terminal determines a transmission resource in a sensing and reservation combined mode.

In a Rel-15 Vehicle-to-Everything system, a multi-carrier transmission solution is introduced, and data of a terminal may be transmitted on one or more carriers. If the terminal selects a plurality of carriers for data transmission, and at least two of the plurality of carriers can serve as a synchronization carrier, then how the terminal selects a synchronization carrier is a problem to be solved.

SUMMARY

To solve the above technical problem, a method and device for selecting a synchronization carrier, and a non-transitory computer storage medium are provided in embodiments of the disclosure.

The method for selecting a synchronization carrier provided in embodiments of the disclosure includes: determining, by a terminal, two or more synchronization carriers from a plurality of carriers, wherein synchronization information is provided on each of the synchronization carriers; and selecting, by the terminal, a first synchronization carrier from the two or more synchronization carriers based on reference information of the two or more synchronization carriers, wherein the first synchronization carrier is used for providing first synchronization information for each of the plurality of carriers, to enable the plurality of carriers to transmit data synchronously based on the first synchronization information.

The device for selecting a synchronization carrier provided in embodiments of the disclosure includes: a memory for storing data, and a processor, wherein the processor is configured to: determine two or more synchronization carriers from a plurality of carriers, wherein synchronization information is provided on each of the synchronization carriers, and select a first synchronization carrier from the two or more synchronization carriers based on reference information of the two or more synchronization carriers, wherein the first synchronization carrier is used for providing first synchronization information for each of the plurality of carriers, to enable the plurality of carriers transmits data synchronously based on the first synchronization information.

The non-transitory computer storage medium provided in embodiments of the disclosure may have a computer-executable instruction stored therein. The computer-executable instruction, when executed by a processor, implements the actions of: determining two or more synchronization carriers from a plurality of carriers, wherein synchronization information is provided on each of the synchronization carriers; and selecting a first synchronization carrier from the two or more synchronization carriers based on reference information of the two or more synchronization carriers, wherein the first synchronization carrier is used for providing first synchronization information for each of the plurality of carriers, to enable the plurality of carriers to transmit data synchronously based on the first synchronization information.

BRIEF DESCRIPTION OF THE DRAWINGS

The drawings described here are used to provide a further understanding of the disclosure, and form part of the disclosure. Schematic embodiments of the disclosure and descriptions thereof are intended to explain the disclosure and not intended to form improper limits to the disclosure. In the drawings.

DETAILED DESCRIPTION

In order to understand the features and technical contents of the embodiments of the disclosure in more detail, the implementation of the embodiments of the disclosure will be described in detail with reference to the accompanying drawings. The attached drawings are for reference only and are not intended to limit the embodiments of the disclosure.

To facilitate understanding of the technical solutions of the embodiments of the disclosure, the mode 3 and the mode 4 in Vehicle-to-Everything technology are explained below respectively.

Figure 1:
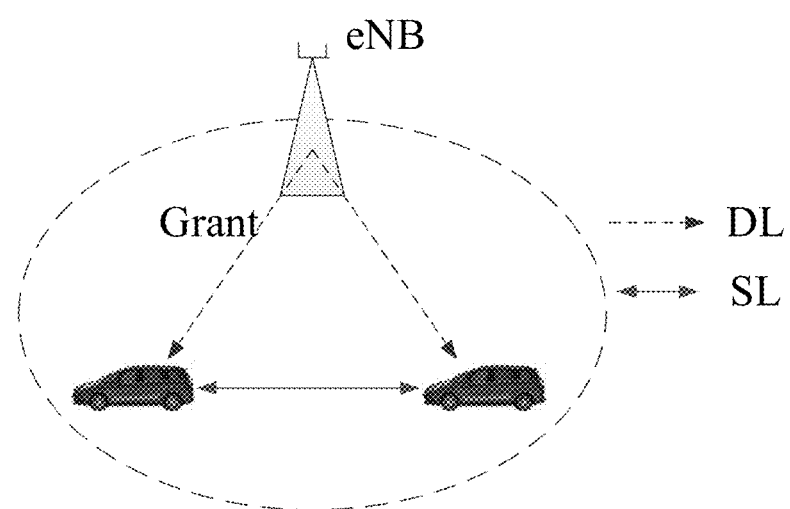
FIG. 1 illustrates a schematic scenario diagram of mode 3 in Vehicle-to-Everything.

Mode 3: as illustrated in FIG. 1, a transmission resource for a vehicle-mounted terminal is allocated by a base station, such as an evolved NodeB (eNB) in LTE. Particularly, the base station issues a control message, for indicating to grant a resource, to the vehicle-mounted terminal through a Down Link (DL); and then, the vehicle-mounted terminal sends data over the SL according to the resource allocated by the base station. In mode 3, the base station may allocate, to the vehicle-mounted terminal, a resource for a single time of transmission, and may also allocate, to the terminal, a resource for semi-static transmission.

Figure 2:
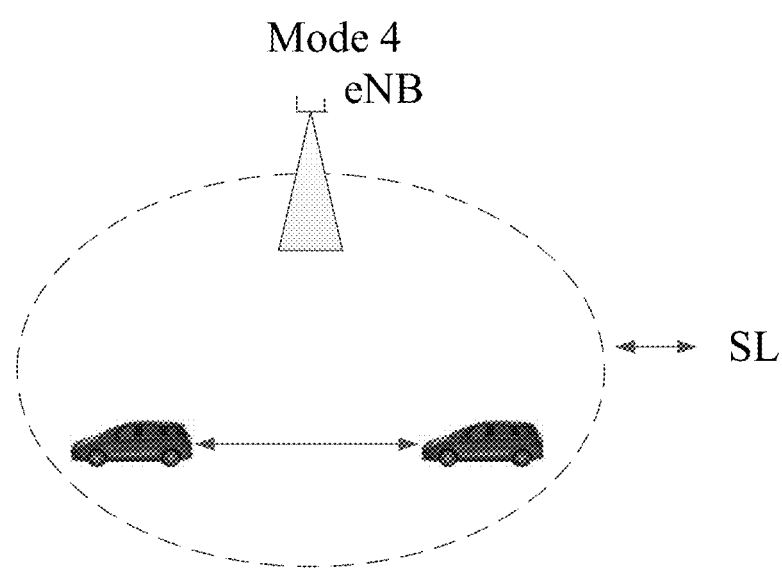
FIG. 2 illustrates a schematic scenario diagram of mode 4 in the Vehicle-to-Everything.

Mode 4: as illustrated in FIG. 2, a sensing and reservation combined transmission mode is used in the vehicle-mounted terminal. The vehicle-mounted terminal acquires a set of available transmission resources from a resource pool in a sensing mode, and the vehicle-mounted terminal randomly selects, from the set of transmission resources, a resource for data transmission. Since services in the Vehicle-to-Everything system have periodicity, a semi-static transmission mode is usually employed in the vehicle-mounted terminal. That is, after selecting a transmission resource, the vehicle-mounted terminal will continue to use the resource in multiple transmission cycles, thereby reducing the probability of resource reselection and resource conflicts. The vehicle-mounted terminal will carry, in control information in this time of transmission, information of a resource to be reserved for next time of transmission, so that other terminals may judge, by detecting the control information of the vehicle-mounted terminal, whether the resource has been reserved to be used by the vehicle-mounted terminal, so as to achieve the purpose of reducing resource conflicts.

It should be noted that in LTE-V2X, mode 3 is used to indicate that a transmission resource for a vehicle-mounted terminal is allocated by a base station, and mode 4 is used to indicate that a transmission resource for a vehicle-mounted terminal is selected by the terminal autonomously. In New Radio Vehicle-to-Everything (NR-V2X), a new transmission mode may be defined, which will not be specified in the disclosure.

In the technical solutions of the embodiments of the disclosure, if the terminal selects a plurality of carriers for data transmission and at least two of the plurality of carriers may serve as a synchronization carrier, the terminal can select, from the two or more synchronization carriers, a synchronization carrier for providing a synchronization reference. Specifically, the terminal selects a synchronization carrier based on reference information on each synchronization carrier (a priority of synchronization information on the synchronization carrier, a priority of the synchronization carrier, a CBR of the synchronization carrier).

All the technical solutions of embodiments of the disclosure are applicable not only to a Vehicle-to-Everything system, but also to other end-to-end communication systems. The terminal in embodiments of the disclosure may be a vehicle terminal, a handheld terminal, a Personal Digital Assistant (PDA), a wearable terminal, and the like. The network in embodiments of the disclosure may be an NR network, an LTE network, or the like.

In the technical solutions of embodiments of the disclosure, a terminal determines two or more synchronization carriers from a plurality of carriers, wherein synchronization information is provided on each of the synchronization carriers; and the terminal selects a first synchronization carrier from the two or more synchronization carriers based on reference information of the two or more synchronization carriers, wherein the first synchronization carrier is used for providing first synchronization information for each of the plurality of carriers, to enable the plurality of carriers to transmit data synchronously based on the first synchronization information. By means of the technical solutions of embodiments of the disclosure, if the terminal selects a plurality of carriers for data transmission and at least two of the plurality of carriers may be used as synchronization carriers, the terminal can select a synchronization carrier (i.e., a first synchronization carrier) according to reference information of each synchronization carrier, and use the synchronization carrier to provide synchronization information (i.e., first synchronization information) for the other carriers. Therefore, the plurality of carriers may transmit data synchronously based on the synchronization information.

Figure 3:
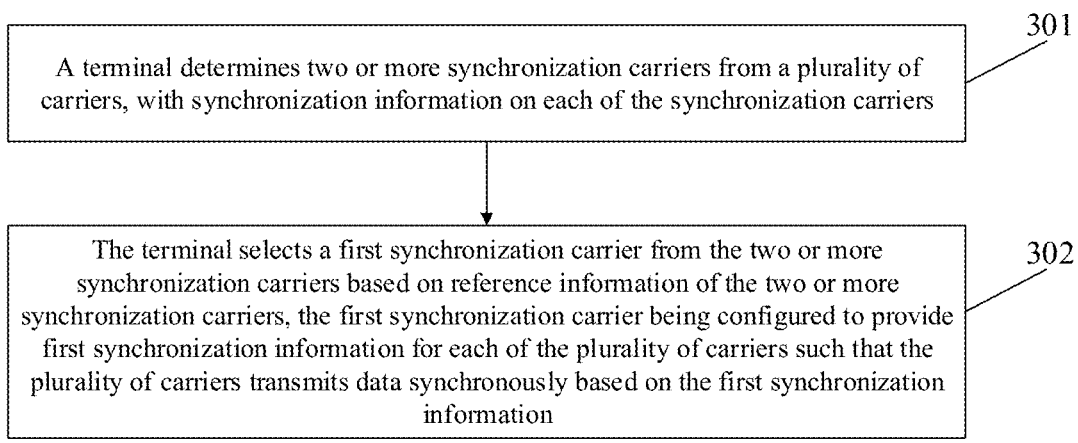
FIG. 3 illustrates a schematic flowchart of a method for selecting a synchronization carrier according to an embodiment of the disclosure.

FIG. 3 illustrates a schematic flowchart of a method for selecting a synchronization carrier according to an embodiment of the disclosure. As illustrated in FIG. 3, the method for selecting a synchronization carrier includes the following actions.

In action 301, a terminal determines two or more synchronization carriers from a plurality of carriers. Synchronization information is provided on each of the synchronization carriers.

In embodiments of the disclosure, the terminal uses a plurality of carriers to transmit data. During particular implementation, the terminal may acquire a transmission resource in mode 3, or may acquire a transmission resource in mode 4.

In embodiments of the disclosure, at least two of the plurality of carriers may serve as a synchronization carrier. Here, the synchronization carrier refers to a carrier having synchronization information provided thereon.

In an implementation, the synchronization information (also referred to as a synchronization source) on the synchronization carrier may be GNSS-based time synchronization information or GNSS-based frequency synchronization information, may also be base station based time synchronization information or base station based frequency synchronization information, or may also be terminal based time synchronization information or terminal based frequency synchronization information.

The synchronization information on the synchronization carrier is used for providing time synchronization information and/or frequency synchronization information for other carriers, so as to realize synchronous data transmission by a plurality of carriers.

In action 302, the terminal selects a first synchronization carrier from the two or more synchronization carriers based on reference information of the two or more synchronization carriers. The first synchronization carrier is used for providing first synchronization information for each of the plurality of carriers, to enable the plurality of carriers to transmit data synchronously based on the first synchronization information.

In embodiments of the disclosure, for each of the two or more synchronization carriers, the reference information of the synchronization carrier includes at least one of the following: a priority of the synchronization information on the synchronization carrier, a priority of the synchronization carrier, or a Channel Busy Ratio (CBR) of the synchronization carrier.

It should be understood that the terminal may select a first synchronization carrier from the two or more synchronization carriers based on one type of the above reference information of each synchronization carrier, may select a first synchronization carrier from the two or more synchronization carriers based on two types of the above reference information of each synchronization carrier, or may select a first synchronization carrier from the two or more synchronization carriers based on the three types of reference information of each synchronization carrier.

A scheme of selecting a synchronization carrier according to embodiments of the disclosure is described below in combination with the different reference information of the synchronization carrier respectively.

1) The reference information of each synchronization carrier is a priority of the synchronization information of the synchronization carrier.

The terminal selects, based on priorities of synchronization information on each of the synchronization carriers, a synchronization carrier having the synchronization information with a highest priority from the two or more synchronization carriers, to be the first synchronization carrier.

In an implementation, the terminal determines the priorities of the synchronization information on the two or more synchronization carriers according to at least configuration information of a base station or pre-configuration information.

During particular implementation, for each of the two or more synchronization carriers, the synchronization information on the synchronization carrier mainly includes the following three types: GNSS-based synchronization information (time synchronization information and/or frequency synchronization information), base station based synchronization information (time synchronization information and/or frequency synchronization information), and terminal based synchronization information (time synchronization information and/or frequency synchronization information). The terminal based synchronization information has the lowest priority.

In the case of covered within a cell, the base station may configure the GNSS-based synchronization information to have a higher priority than the base station based synchronization information, or may configure the base station based synchronization information to have a higher priority than the GNSS-based synchronization information. It is worth noticing that in the scenario of not covered within a cell, there is no base station based synchronization information.

Different synchronization carriers may have different synchronization information. For example, the terminal needs to use a carrier 1 and a carrier 2 for data transmission. The synchronization information of the carrier 1 is GNSS-based synchronization information, and the synchronization information of the carrier 2 is terminal based synchronization information. At this time, the terminal selects the carrier 1 as a synchronization carrier according to the priorities of the synchronization information of the carrier 1 and the carrier 2.

2) The reference information of each synchronization carrier is a priority of the synchronization carrier.

The terminal selects, based on priorities of the two or more synchronization carriers, a synchronization carrier having the synchronization information with a highest priority from the two or more synchronization carriers, to be the first synchronization carrier.

2.1) In an implementation, among the two or more synchronization carriers, a synchronization carrier serving as a main carrier has the highest priority.

During particular implementation, if a plurality of carriers used by the terminal for data transmission include a main carrier (or referred to as an anchor carrier) and the main carrier has synchronization information thereon, the terminal selects the main carrier to be a synchronization carrier.

Here, the main carrier (also referred to as an anchor carrier) refers to a carrier on which all terminals need to receive and/or send data. For example, the main carrier may be a carrier used for transmitting a broadcast messages in 3GPP Rel-14. In order to ensure backward compatibility, in all the subsequent versions, a terminal needs to receive data on the carrier and/or send data on the carrier.

2.2) In an implementation, among the two or more synchronization carriers, a synchronization carrier having a lowest service priority value has the highest priority.

During particular implementation, different carriers correspond to different service priorities, and the terminal selects a carrier having a highest priority from a plurality of carriers, to be a synchronization carrier. For example, the terminal uses a carrier 1 and a carrier 2 for data transmission, a service priority value corresponding to the carrier 1 is 2, and a service priority value corresponding to the carrier 2 is 3. Then, the terminal uses the carrier 1 to be a synchronization carrier. It is worth noticing that a lower service priority value represents a higher service priority. For example, if a value range of a Proximity-based Service (ProSe) Per-Packet Priority (PPPP) is 1 to 8, then PPPP=1 represents the highest priority, and PPPP=8 represents the lowest priority.

3) The reference information of each synchronization carrier is a Channel Busy Ratio (CBR) of the synchronization carrier.

The terminal selects, based on CBRs of the two or more synchronization carriers, a synchronization carrier having a lowest CBR from the two or more synchronization carriers, to be the first synchronization carrier.

During particular implementation, the terminal may measure a CBR of each carrier, and the terminal selects a synchronization carrier according to the obtained CBR. For example, the terminal selects a carrier having the lowest CBR to be the synchronization carrier.

In the above examples, the case where only one type of reference information is used to select a synchronization carrier is taken as an example. In practical applications, two or three types of reference information may be used to select a synchronization carrier based on the same selection principles. With an example of selecting a synchronization carrier according to two types of reference information, K synchronization carriers are selected from N synchronization carriers according to a first type of reference information firstly, and then a final synchronization carrier is selected from the K synchronization carriers according to a second type of reference information. Which synchronization information described above the first reference information and the second reference information corresponds to respectively is not specified in the disclosure. For example, the terminal uses a carrier 1, a carrier 2 and a carrier 3 for data transmission. The synchronization information of the carrier 1 and the carrier 2 is GNSS-based synchronization information. The synchronization information of the carrier 3 is terminal based synchronization information. Firstly, according to priorities of the synchronization information, the terminal selects the carrier 1 and the carrier 2 as available synchronization carriers. Secondly, the terminal selects, according to CBRs of the available synchronization carriers, a carrier having a lower CBR from the carrier 1 and the carrier 2, to be a synchronization carrier.

Figure 4:
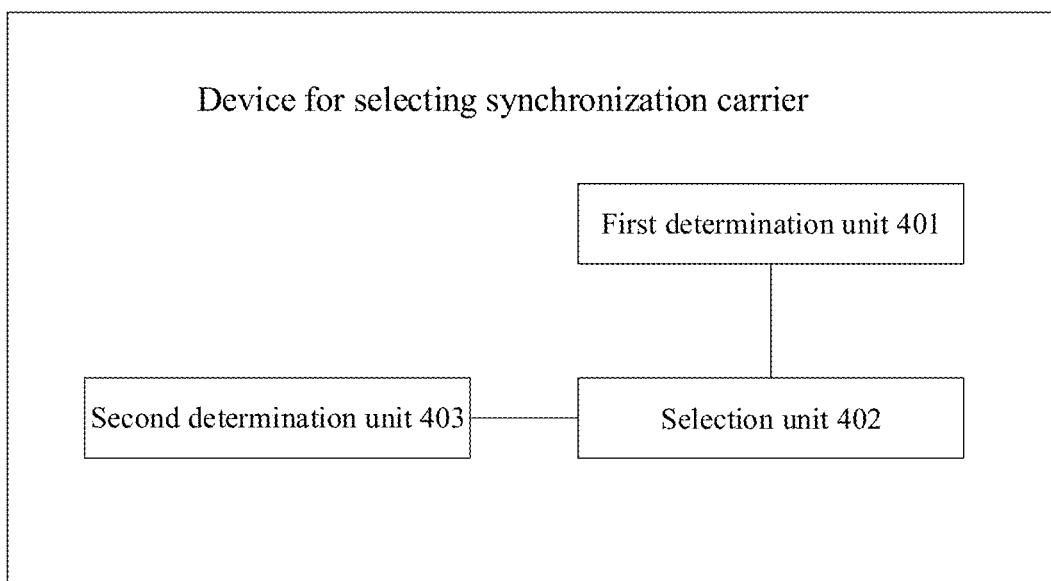
FIG. 4 illustrates a schematic diagram of structural composition of a device for selecting a synchronization carrier according to an embodiment of the disclosure.

FIG. 4 illustrates a schematic diagram of structural composition a device for selecting a synchronization carrier according to an embodiment of the disclosure. As illustrated in FIG. 4, the device includes a first determination unit 401 and a selection unit 402.

The first determination unit is configured to determine two or more synchronization carriers from a plurality of carriers. Synchronization information is provided on each of the synchronization carriers.

The selection unit is configured to select a first synchronization carrier from the two or more synchronization carriers based on reference information of the two or more synchronization carriers. The first synchronization carrier is used for providing first synchronization information for each of the plurality of carriers, to enable the plurality of carriers to transmit data synchronously based on the first synchronization information.

In an implementation, for each of the two or more synchronization carriers, the reference information of the synchronization carrier includes at least one of the following: a priority of the synchronization information on the synchronization carrier, a priority of the synchronization carrier, or a CBR of the synchronization carrier.

In an implementation, the selection unit 402 is configured to select, based on priorities of synchronization information on each of the synchronization carriers, a synchronization carrier having the synchronization information with a highest priority from the two or more synchronization carriers, to be the first synchronization carrier.

In an implementation, the device further includes a second determination unit 403. The second determination unit is configured to determine the priorities of the synchronization information on the two or more synchronization carriers according to at least configuration information of a base station or pre-configuration information.

In an implementation, the selection unit 402 is configured to select, based on priorities of the two or more synchronization carriers, a synchronization carrier having the synchronization information with a highest priority from the two or more synchronization carriers, to be the first synchronization carrier.

In an implementation, among the two or more synchronization carriers, a synchronization carrier serving as a main carrier has the highest priority.

In an implementation, among the two or more synchronization carriers, a synchronization carrier having a lowest service priority value has the highest priority.

In an implementation, the selection unit 402 is configured to select, based on CBRs of the two or more synchronization carriers, a synchronization carrier having a lowest CBR from the two or more synchronization carriers, to be the first synchronization carrier.

In an implementation, for each of the two or more synchronization carriers, the synchronization information on the synchronization carrier is one of: at least one of GNSS-based time synchronization information or GNSS-based frequency synchronization information; at least one of base station based time synchronization information or base station based frequency synchronization information; or at least one of terminal based time synchronization information or terminal based frequency synchronization information.

Those skilled in the art should understand that the function realized by each of the units in the device for selecting a synchronization carrier illustrated in FIG. 4 can be understood by referring to the related description of the foregoing method for selecting a synchronization carrier. The function of each unit in the device for selecting a synchronization carrier illustrated in FIG. 4 may be realized through a program running on a processor, and may also be realized through a specific logical circuit.

When implemented in the form of a software function module and marketed or used as an independent product, the device for selecting a synchronization carrier according to embodiments of the disclosure may also be stored in a computer-readable storage medium. Based on such an understanding, the technical solutions of the embodiments of the disclosure substantially or in part making contributions to the conventional art may be embodied in form of a software product, and the computer software product is stored in a storage medium, including a plurality of instructions configured to enable a computer device (which may be a personal computer, a server, a network device or the like) to execute all or part of the method in various embodiments of the disclosure. The foregoing storage medium includes: various media capable of storing program codes such as a U disk, a mobile hard disk, a Read Only Memory (ROM), a disk or an optical disc. Therefore, embodiments of the disclosure are not limited to any specific hardware and software combination.

Correspondingly, in embodiments of the disclosure, also provided is a computer storage medium, in which a computer-executable instruction is stored. The computer-executable instruction, when executed by a processor, implements the method for selecting a synchronization carrier of embodiments of the disclosure.

Figure 5:
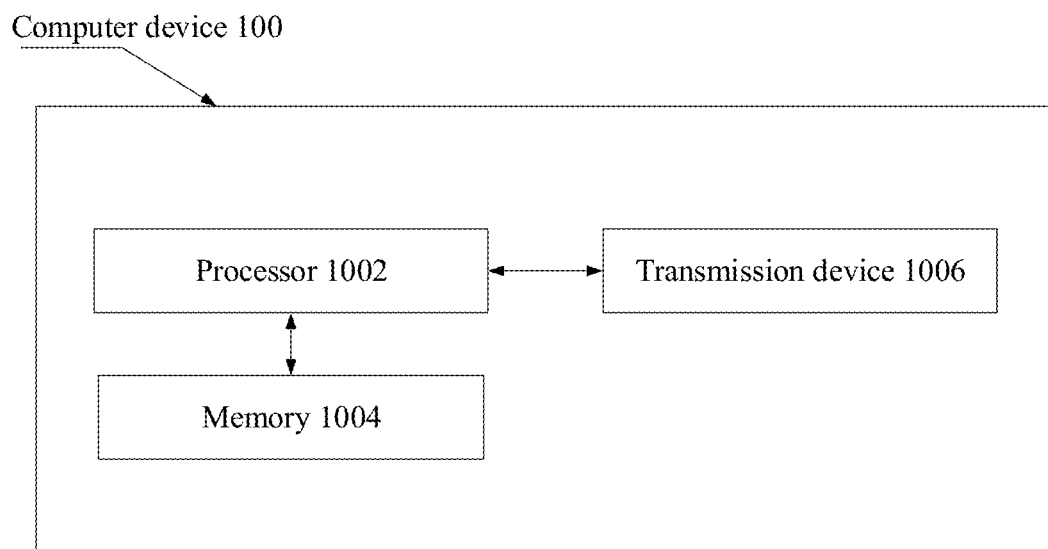
FIG. 5 illustrates a schematic diagram of structural composition of a computer device according to an embodiment of the disclosure.

FIG. 5 illustrates a schematic diagram of structural composition illustrating a computer device according to an embodiment of the disclosure. The computer device may be any type of terminal. As illustrated in FIG. 5, the computer device 100 may include one or more (only one is shown in the figure) processors 1002 (the processor 1002 may include, but is not limited to, a Micro Controller Unit (MCU) or a Field Programmable Gate Array (FPGA) or other processing devices), a memory 1004 for storing data, and a transmission device 1006 for a communication function. Those of ordinary skill in the art can understand that the structure illustrated in FIG. 5 is only schematic, and does not limit the structure of the above electronic device. For example, the computer terminal 100 may further include components more or fewer than the components illustrated in FIG. 5, or have a different configuration from that illustrated in FIG. 5.

The memory 1004 may be configured to store a software program and module of application software, such as a program instruction/module corresponding to a method in embodiments of the disclosure. The processor 1002 runs the software program and module stored in the memory 1004 to execute various functional applications and data processing, i.e., implementing the above method. The memory 1004 may include a high speed random access memory and may further include a non-volatile memory such as one or more magnetic storage devices, flash memories or other non-volatile solid-state memories. In some examples, the memory 1004 may further include a memory arranged remotely relative to the processor 1002 and the remote memory may be connected to the computer device 100 through a network. An example of the network includes, but not limited to, the Internet, an intranet, a local area network, a mobile communication network and a combination thereof.

The transmission device 1006 is configured to receive or send data via a network. In a specific example, the above network may include a wireless network provided by a communication provider of the computer device 100. In an example, the transmission device 1006 includes a Network Interface Controller (NIC), which may be connected with another network device through a base station, thereby communicating with the Internet. In an example, the transmission device 1006 may be a Radio Frequency (RF) module configured to communicate with the Internet in a wireless manner.

The technical solutions recorded in the embodiments of the disclosure may be freely combined without conflicts.

In some embodiments provided in the disclosure, it is to be understood that the disclosed method and device may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical, mechanical or in other forms.

The units described as separate parts may or may not be physically separated, and parts displayed as units may or may not be physical units, and namely may be located in the same place, or may also be distributed to multiple network units. Some or all of the units may be selected according to a practical requirement to achieve the purposes of the solutions of the embodiments.

In addition, functional units in various embodiments of the disclosure may be all integrated into a second processing unit, or each unit may also serve as an independent unit and two or more than two units may also be integrated into a unit. The integrated unit may be implemented in a hardware form and may also be implemented in the form of hardware and software functional unit.

The above are only detailed description of the disclosure and not intended to limit the scope of protection of the disclosure. Any variations or replacements apparent to those skilled in the art within the technical scope disclosed in the disclosure shall fall within the scope of protection of the disclosure.

What is claimed is:

1. A method for selecting a synchronization carrier, comprising:
   determining, by a terminal, two or more synchronization carriers from a plurality of carriers, wherein synchronization information is provided on each of the synchronization carriers; and
   selecting, by the terminal, a first synchronization carrier from the two or more synchronization carriers based on reference information of the two or more synchronization carriers, wherein the first synchronization carrier is used for providing first synchronization information for each of the plurality of carriers, to enable the plurality of carriers to transmit data synchronously based on the first synchronization information.

2. The method according to claim 1, wherein for each of the two or more synchronization carriers, the reference information of the synchronization carrier comprises at least one of the following:
   a priority of the synchronization information on the synchronization carrier, a priority of the synchronization carrier, or a Channel Busy Ratio (CBR) of the synchronization carrier.

3. The method according to claim 2, wherein selecting, by the terminal, the first synchronization carrier from the two or more synchronization carriers based on the reference information of the two or more synchronization carriers comprises:
   selecting, by the terminal, based on priorities of synchronization information on each of the synchronization carriers, a synchronization carrier having the synchronization information with a highest priority from the two or more synchronization carriers, to be the first synchronization carrier.

4. The method according to claim 3, further comprising:
   determining, by the terminal, the priorities of the synchronization information on the two or more synchronization carriers, according to at least configuration information of a base station or pre-configuration information.

5. The method according to claim 2, wherein selecting, by the terminal, the first synchronization carrier from the two or more synchronization carriers based on the reference information of the two or more synchronization carriers comprises:
   selecting, by the terminal, based on priorities of the two or more synchronization carriers, a synchronization carrier having the synchronization information with a highest priority from the two or more synchronization carriers, to be the first synchronization carrier.

6. The method according to claim 5, wherein among the two or more synchronization carriers, a synchronization carrier serving as a main carrier has the highest priority.

7. The method according to claim 5, wherein among the two or more synchronization carriers, a synchronization carrier having a lowest service priority value has the highest priority.

8. The method according to claim 2, wherein selecting, by the terminal, the first synchronization carrier from the two or more synchronization carriers based on the reference information of the two or more synchronization carriers comprises:
   selecting, by the terminal, based on Channel Busy Ratios (CBRs) of the two or more synchronization carriers, a synchronization carrier having a lowest CBR from the two or more synchronization carriers, to be the first synchronization carrier.

9. The method according to claim 1, wherein for each of the two or more synchronization carriers, the synchronization information on the synchronization carrier is one of:
   at least one of Global Navigation Satellite System (GNSS)-based time synchronization information or Global Navigation Satellite System (GNSS)-based frequency synchronization information;
   at least one of base station based time synchronization information or base station based frequency synchronization information; or
   at least one of terminal based time synchronization information or terminal based frequency synchronization information.

10. A device for selecting a synchronization carrier, comprising: a memory for storing data, and a processor, wherein the processor is configured to:
    determine two or more synchronization carriers from a plurality of carriers, wherein synchronization information is provided on each of the synchronization carriers; and
    select a first synchronization carrier from the two or more synchronization carriers based on reference information of the two or more synchronization carriers, wherein the first synchronization carrier is used for providing first synchronization information for each of the plurality of carriers, to enable the plurality of carriers to transmit data synchronously based on the first synchronization information.

11. The device according to claim 10, wherein for each of the two or more synchronization carriers, the reference information of the synchronization carrier comprises at least one of the following:

a priority of the synchronization information on the synchronization carrier, a priority of the synchronization carrier, or a Channel Busy Ratio (CBR) of the synchronization carrier.

12. The device according to claim 11, wherein the processor is configured to select, based on priorities of synchronization information on each of the synchronization carriers, a synchronization carrier having the synchronization information with a highest priority from the two or more synchronization carriers to be the first synchronization carrier.

13. The device according to claim 12, wherein the processor is further configured to determine the priorities of the synchronization information on the two or more synchronization carriers, according to at least configuration information of a base station or pre-configuration information.

14. The device according to claim 11, wherein the processor is further configured to select, based on priorities of the two or more synchronization carriers, a synchronization carrier having the synchronization information with a highest priority from the two or more synchronization carriers, to be the first synchronization carrier.

15. The device according to claim 14, wherein among the two or more synchronization carriers, a synchronization carrier serving as a main carrier has the highest priority.

16. The device according to claim 14, wherein among the two or more synchronization carriers, a synchronization carrier having a lowest service priority value has the highest priority.

17. The device according to claim 11, wherein the processor is further configured to select, based on Channel Busy Ratios (CBRs) of the two or more synchronization carriers, a synchronization carrier having a lowest CBR from the two or more synchronization carriers, to be the first synchronization carrier.

18. The device according to 10, wherein for each of the two or more synchronization carriers, the synchronization information on the synchronization carrier is one of:

at least one of Global Navigation Satellite System (GNSS)-based time synchronization information or Global Navigation Satellite System (GNSS)-based frequency synchronization information;

at least one of base station based time synchronization information or base station based frequency synchronization information; or at least one of terminal based time synchronization information or terminal frequency synchronization information.

19. A non-transitory computer storage medium, having computer-executable instructions stored therein, the computer-executable instructions, when executed by a processor, implement the actions of:

determining two or more synchronization carriers from a plurality of carriers, wherein synchronization information is provided on each of the synchronization carriers; and selecting a first synchronization carrier from the two or more synchronization carriers based on reference information of the two or more synchronization carriers, wherein the first synchronization carrier is used for providing first synchronization information for each of the plurality of carriers, to enable the plurality of carriers to transmit data synchronously based on the first synchronization information.

20. The non-transitory computer storage medium according to claim 19, wherein for each of the two or more synchronization carriers, the reference information of the synchronization carrier comprises at least one of the following:

a priority of the synchronization information on the synchronization carrier, a priority of the synchronization carrier, or a Channel Busy Ratio (CBR) of the synchronization carrier.

* * * * *